United States Patent Office 2,934,464
Patented Apr. 26, 1960

2,934,464

ORGANOSILOXANE RESIN COMPOSITIONS AND GLASS LAMINATES IMPREGNATED THEREWITH

Kenneth R. Hoffman and Melvin E. Nelson, Midland, Mich., assignors to Dow Corning Corporation, Midland, Mich., a corporation of Michigan No Drawing. Application December 18, 1958
Serial No. 781,194

9 Claims. (Cl. 154—43)

This invention relates to organosiloxane resins suitable for laminating at pressures of 200 p.s.i. or less.

This application is a continuation-in-part of applicants' copending applications Serial Number 629,240 and Serial Number 629,244, both filed December 19, 1956, said applications now abandoned.

Prior to this invention the best high temperature, low pressure laminating siloxane resins were those described and claimed in U.S. Patent 2,718,483. The term low pressure laminating resins means resins which can be suitably molded at pressure of 200 p.s.i. or below. The resins described in the aforesaid patent produce laminates which have flexural strengths upwards of 40,000 p.s.i. at room temperature and upwards of 14,000 p.s.i. at 500° F. These values are far superior to those of any previously known siloxane low pressure laminating resins. As a result, the siloxane laminating resins of the aforesaid patent opened up new fields for the use of organosiloxanes and are at the present time being commercially employed in many applications.

However, these resins suffer from the disadvantage of being difficult to fabricate because the uncured resin is quite brittle at room temperature. This deficiency is known generally in the art as a deficiency of drape. This deficiency of drape means that glass fabric which is impregnated with the uncured resin is difficult to form into cured shapes. This in turn means that it is difficult to handle these resins in the processes now employed in the fabrication of low pressure laminated articles. Since low pressure laminated articles are of great commercial importance, this brittleness of the aforesaid resins is a considerable deterrent to the use of organosiloxane resins.

Another disadvantage of the aforesaid resins is the fact that at room temperature, when in the uncured state, they possess no appreciable tackiness. Consequently, it is difficult to obtain adherence between the various laminate layers prior to curing when the laminate is built up in a curved mold.

Because of the fabrication difficulties the aforesaid laminating resins are not conveniently employed in the conventional molding techniques used with organic laminating resins. As a result, the use of these siloxane laminating resins has been restricted.

The present invention relates to compositions of matter which improve the flexibility of low pressure laminating siloxane resins so that they can be readily fabricated in conventional processes. This improvement is brought about without substantially lowering the high temperature strength of the cured laminate.

Commercially useable organosiloxane casting resins are described in U.S. Patent 2,714,099 and in the copending application of Harold A. Clark, Serial No. 598,264, filed July 17, 1956. These casting resins are based upon vinylsiloxanes as the active ingredient. The resins are cured, generally, by heating them with organic peroxides which cures the resin via the vinyl group. These resins make excellent castings and can also be employed in the production of laminates and molding compounds. However, the thermal stability of these heretofore employed casting organosilicon resins leaves something to be desired. The present invention provides a method which upgrades the thermal stability of these casting resins without affecting the desirable handling properties thereof in laminating.

It is the primary object of this invention to provide improved organosilicon resinous compositions which combine ease of fabrication and a high degree of thermal stability to an extent heretofore unknown in organosilicon resins. Other objects and advantages will be apparent from the following description.

This invention relates to a composition of matter comprising a mixture of from 5 to 95% by weight of (1) a siloxane composed essentially of from 4.5 to 17 mol percent of diphenylsiloxane units, from 22 to 55 mol percent of monophenylsiloxane units, from 25 to 65 mol percent, preferably from 40 to 65 mol percent, of monomethylsiloxane units and up to 38 mol percent of phenylmethylsiloxane units and from 5 to 95% by weight of (2) a composition selected from the group consisting of (A) a silicon compound, compatible with (1), having a viscosity of at least 500 cs. at 25° C. and having per silicon atom an average of at least 1.5 hydrocarbon radicals selected from the group consisting of the phenyl, vinyl and methyl radicals such that the phenyl to silicon ratio is at least 0.7:1, the vinyl to silicon ratio ranges from 0.3:1 to 1:1 and each vinyl group is attached to a siloxysilicon atom, the remaining silicon valences of (A) being satisfied with substituents selected from the group consisting of oxygen atoms, phenylene radicals and alkylene radicals of less than four carbon atoms, and (B) a silicon compound, compatible with (1) and (A), having a viscosity of less than 500 cs. at 25° C. and having at least two siloxy-silicon-bonded vinyl groups per molecule, the remaining silicon valences of (B) being satisfied with substituents selected from the group consisting of oxygen atoms, phenyl radicals, methyl radicals, phenylene radicals and alkylene radicals of less than four carbon atoms, said compound (B) being present in an amount no greater than 50% by weight of the cumulative weight of components (1) and (2).

The compositions of this invention are prepared by mixing components (1) and (2) in the desired proportions. Component (1) employed in this invention is a copolymer of diphenylsiloxane, monophenylsiloxane and monomethylsiloxane units, which may also contain some copolymerized phenylmethylsiloxane units or mixtures of such copolymers. These resins may be prepared by cohydrolyzing the corresponding chlorosilanes in the conventional manner for preparing siloxane resins.

Component (2) can be composed entirely of silicon compound (A) or silicon compound (B) or combinations of the two. Compound (A) has a viscosity of at least 500 cs. at 25° C. while compound (B) has a viscosity of less than 500 cs. at 25° C. Compound (A) employed herein is a copolymer which must contain from 0.3 to 1 vinyl group per silicon atom attached only to siloxy-silicon atoms, i.e. silicon atoms joined to at least one other silicon atom by a SiOSi linkage, and at least 0.7 phenyl groups per silicon atom to be an effective agent in the compositions of this invention. Any remaining monovalent organic groups can be methyl. If the vinyl to silicon ratio is above 1:1, the thermal stability of the cured resin is deleteriously affected. The thermal stability is also poor when the phenyl to silicon ratio in siloxanes (A) drops below .7:1. In order for siloxanes (A) to impart satisfactory flexibility to the mixture, the total number of phenyl, methyl and vinyl radicals per silicon atom should be at least 1.5. The upper limit of the degree of substitution is not critical except that it should not be so high that the viscosity of the product is below 500 cs.

When compound (A) has a viscosity below 500 cs. as in compound (B) the resulting mixture of (1) and (2) does not ultimately produce the desired resin strength when the amount of (A) is greater than 50 percent by weight of the cumulative weight of (1) and (2)). The upper limit of the viscosity of (A) is not critical, but may range up to that of non-flowing gums.

The silicon atoms of compound (A) are joined by oxygen atoms, phenylene radicals, methylene radicals, dimethylene radicals and trimethylene radicals. Therefore, compound (A) can contain, for example, any of the following units in any proportion provided the above critical limits on (A) are not exceeded:

$(C_2H_3)SiO_{1.5}$, $(C_2H_3)(C_6H_5)SiO$, $(C_2H_3)(CH_3)SiO$, $(C_2H_3)(CH_3)(C_6H_5)SiO_5$, $(CH_3)(C_6H_5)SiO$ $(CH_3)SiO_{1.5}$, $(C_6H_5)SiO_{1.5}$

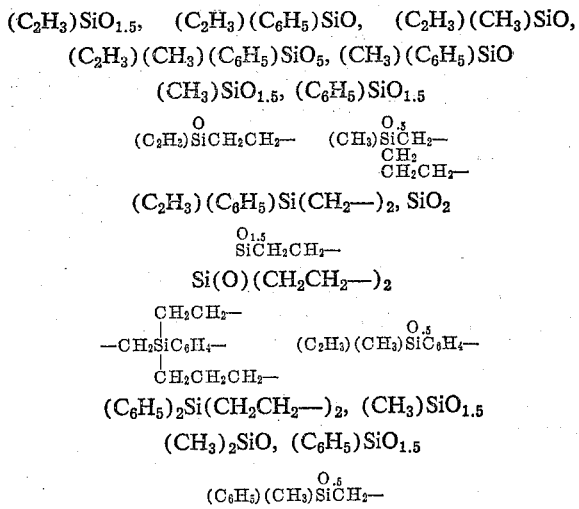

$(C_6H_5)_2Si(CH_2CH_2-)_2$, $(CH_3)SiO_{1.5}$ $(CH_3)_2SiO$, $(C_6H_5)SiO_{1.5}$

and $(CH_3)_2(C_2H_3)SiO_{.5}$

The preparation of the siloxanes from the corresponding hydrolyzable silanes is well-known in the art. The preparation of the materials employing silphenylene, silmethylene, silethylene and silpropylene linkages as well as siloxane linkages are also well-known in the art as shown by U.S. Patents 2,828,279; 2,479,374; 2,507,516 and 2,819,282.

It is preferable, however, that compound (A) is a polysiloxane containing in any proportion within the above critical limits only such units as, for example, monovinylsiloxane, phenylvinylsiloxane, methylvinylsiloxane, phenylmethylsiloxane, diphenylsiloxane, monophenylsiloxane, monomethylsiloxane, dimethylsiloxane and triorganosiloxane units of the formula $R_3SiO$ where R is methyl, phenyl or vinyl.

Where maximum heat stability is desired, the preferred composition is from 50 to 95% by weight of siloxane (1) to 5 to 50% by weight of siloxane (A). These compositions impart sufficient flexibility to the resin to give ease of fabrication and at the same time insure maximum heat stability so that the resin laminates have room temperature flexural strengths of the order of 35,000 to 45,000 p.s.i. or above and flexural strengths at 500° F. of the order of 10,000 to 15,000 p.s.i. or above. When the amount of siloxane resin (A) is above 50% by weight, the resins show improved thermal stability over previously known siloxane casting resins while at the same time maintaining the excellent flexural strengths of those resins.

Organosilicon compounds (B) which are employed herein are low molecular weight vinyl containing compounds which must be compatible with resins (1) and (A) if present. In order to be effective in this invention these compounds (B) must contain at least two vinyl groups per molecule attached only to siloxy-silicon atoms. The specific amount of compounds (B) employed in order to obtain the desired flexibility in the resin varies with the viscosity of (B). Thus if (B) has a viscosity of say 5 cs., less of it will be employed to give the desired flexibility to the resins (1) than if (B) had a viscosity of say 400 cs. In any event, the amount of (B) employed should be not more than 50% of the total weight of (1) and (2) in order to achieve the desired resin strength. Compound (B) can contain phenyl groups and methyl groups in addition to vinyl groups.

The silicon atoms of compound (B) can be joined by oxygen atoms, phenylene radicals, methylene radicals, dimethylene radicals and trimethylene radicals similar to compound (A). Thus, any of the units shown above in compound (A) can be present in compound (B) within the above critical limits on (B).

However, as is true with compound (A), compound (B) preferably contains only siloxane linkages. Specific examples of siloxanes (B) which are operative herein are divinyldiphenyldimethyldisiloxane, triphenyldivinylmethyldisiloxane, tetraphenyltetravinylcyclotetrasiloxane, tetravinyldiphenyldimethylcyclotetrasiloxane, divinyltetraphenyltetramethylcyclopentasiloxane, $(CH_3)_2(C_2H_3)SiOSi(CH_3)(C_6H_5)OSi(CH_3)_2(C_2H_3)$,
$(CH_3)_2(C_2H_3)SiOSi(C_6H_5)_2OSi(CH_3)_2(C_2H_3)$,
$(C_6H_5)Si[OSi(C_6H_5)_2(C_2H_3)]_2[OSi(CH_3)_2(C_2H_3)]$,
$[(CH_3)_2(C_2H_3)SiO]_3SiC_6H_4Si[OSi(C_6H_5)_2(CH_3)]_3$,
$(C_2H_3)_2(CH_3)SiCH_2Si(C_6H_5)_3$, and
$(CH_3)_3SiO[Si(C_6H_5)(C_2H_3)O]_8Si(CH_3)_3$.

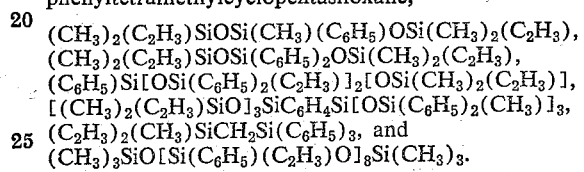

Applicants have found that when laminating resins (1) are mixed with the organosilicon compounds (B) alone within the specified limits improved flexibility and drape of the resulting mixture is obtained without seriously affecting the physical properties of the mixture. Consequently, they may be more readily employed for impregnating fabrics or for impregnating intricate articles such as electrical equipment. However, if the amount of compounds (B) exceeds 50% by weight of the mixture, the resulting resin is defective in physical strength.

Where component (2) contains both siloxane (A) and silicon compound (B), the handling properties and thermal stability will vary accordingly. The compositions of this invention include mixtures comprising from 5 to 95% of (1) and from 5 to 95% of (A), mixtures comprising from 50 to 95% of (1) and from 5 to 50% of (B) and mixtures comprising from 5 to 95% of (1) and from 5 to 95% of (2) where (2) is a mixture of (A) and (B) such that the amount of (B) is no more than 50% by weight of the cumulative weight of (1) and (2). In the last mixture less than 5% by weight of each of (A) and (B) can be present so long as the cumulative weight of (A) and (B) is at least 5% by weight of the cumulative weight of (1) and (2).

The compositions of this invention are cured by heating them with a combination of catalysts. One catalyst of this combination must be a silanol condensation catalyst which cures the mixture by condensing the hydroxyl groups in (1). For the purpose of this invention any silanol condensation catalyst can be employed such as, for example, metallic salts of carboxylic acids such as lead octoate, zinc hexoate, cobalt naphthenate, dibutyltindioctoate, zinc naphthenate, indium octoate and indium naphthenate; amines such as triethanol amine, and quaternary ammonium compounds such as benzyl trimethyl ammonium butoxide, beta-hydroxy ethyl trimethyl ammonium 2-ethylhexoate, phenyl trimethyl ammonium acetate and vinyl triethyl ammonium methoxide. These catalysts may be used in amounts from .05 to 10% or above by weight of (1). The optimum amount varies with catalyst type and precise resin formulation.

The second type of catalyst employed is any organic peroxide capable of curing vinyl silicon compounds through the silicon-bonded vinyl groups. During the curing of the vinylsilicon compounds, there is apparent copolymerization of the siloxanes in components (1) and (2) which is believed to proceed by the interaction of the vinyl groups in (2) with the methyl radicals in siloxane (1). Suitable peroxides are, for example, ditertiarybutyl peroxide, dicumyl peroxide and tertiary butyl perbenzoate. The peroxides can be employed in amount from .25 to 10% by weight or above of siloxanes (2).

In curing the compositions of this invention, both types of catalysts are admitted with the resin composition and the curing with both types of catalysts occurs simultaneously.

The resins of this invention may be mixed with any desired filler such as glass or asbestos fibers, clay, glass flakes, diatomaceous earth, sand and metallic oxides such as ferric oxide, titania, zinc oxide and alumina. The resins may also be mixed with any desired pigment, oxidation inhibitor or other additives which are employed with organosiloxane resins.

The resins are particularly adaptable for the manufacture of glass cloth laminates. These laminates are made by impregnating the fabric with the resin. If the resin mixtures (1) and (2) are too viscous for proper impregnation of the fabric, they may be diluted with a suitable solvent such as xylene, toluene or petroleum spirits. After impregnation of the fabric, the solvent, if any, is removed by drying and the resulting impregnated material remains flexible conforming easily to curved forms, and does not crack when bent around such curved forms. Furthermore, the impregnated cloth has sufficient tack that the various plies of the laminate adhere together prior to curing. This facilitates the formation of complicated shapes and will permit the so-called bag molding technique to be employed more readily. After the laminate has been formed into the desired shape, the resin is then cured.

The resins of this invention with or without filler or glass fabric are molded by heating at temperatures above 110° C. until the desired state of cure is obtained. After molding the resins can be given an after-bake which may be carried out at temperatures up to 250° C. or above. This after-bake develops the ultimate high temperature strengths in the compositions.

The compositions of this invention are useful for impregnating electrical equipment, for the formation of cast articles and molded structural members, for use in the formation of structural laminates and for the formation of hot air conduits.

The following examples are illustrative only and should not be construed as limiting the invention which is properly delineated in the appended claims.

*Example 1*

The siloxane employed in this example was a mixture of 60% by weight of (1) a copolymer of 10 mol percent diphenylsiloxane, 35 mol percent monophenylsiloxane and 55 mol percent monomethylsiloxane and 40% by weight of (2) an 1800 cs. copolymer of phenylvinylsiloxane and phenylmethylvinylsiloxane. .8% by weight dicumyl peroxide and .12% by weight beta-hydroxy ethyl trimethyl ammonium 2-ethylhexoate, both based on the total weight of the siloxane mixture were added and the resulting mixture was dissolved in toluene to give a 70% by weight toluene solution. Heat cleaned 181 glass cloth, which is a continuous filament satin weave fabric, was immersed in the solution and then air dried 30 minutes and heated 10 minutes at 90° C. The siloxane pickup was 34%.

This impregnated, precured fabric was then laid up in three plies in a mold for a motor housing. The housing had a diameter of 1 foot. The lay-up required 45 minutes and was accomplished without the necessity of cutting or heating the impregnated fabric in order to free it from wrinkles around sharp bends. The resulting laminate was then heated at 13 p.s.i. at 165° C. for 1 hour. The molded laminate was then given an after-bake as follows: The laminate was heated 16 hours at 90° C., and then the temperature was gradually raised from 125 to 250° C. over a period of 10 hours and finally the laminate was cured an additional 12 hours at 250° C. The thermal stability of the resulting laminate was excellent.

By contrast, the same type of glass cloth was impregnated with a toluene solution of a copolymer of 10 mol percent diphenylsiloxane, 35 mol percent monophenylsiloxane and 55 mol percent monomethylsiloxane containing .12% by weight beta-hydroxy ethyl trimethyl ammonium 2-ethylhexoate, based upon the weight of the resin. The impregnated cloth was then air dried for 30 minutes and precured 10 minutes at 90° C. Three ply laminates of this material were laid up in the mold for motor housing shown above. This procedure required 3 hours.

*Example 2*

Heat cleaned 181 glass cloth was impregnated by dipping it into a 70% toluene solution of a mixture of 75% by weight of resin (1) of Example 1 and 25% by weight of a 2400 cs. viscosity copolymer of 6 mol percent dimethylvinylsiloxane, 35 mol percent phenylvinylsiloxane and 59 mol percent phenylmethylsiloxane, .5% by weight based on the total weight of the siloxane of dicumyl peroxide and .15% by weight based on the total weight of the siloxane of beta-hydroxy ethyl trimethyl ammonium 2-ethylhexoate. The impregnated cloth was precured as in Example 1 and then stacked into a 14 ply laminate so that the warp of alternate layers was at 90° to each other. This laminate was press molded in a flat sheet for 30 minutes at 30 p.s.i. at 175° C. The mold was cooled, the laminate was removed and given the same after-bake as in Example 1. The flexural strength of this laminate at room temperature was 44,000 p.s.i. and at 500° F. it was 12,000 p.s.i. After 200 hours at 250° C. the flexural strength was 39,000 p.s.i. at room temperature and 17,000 p.s.i. at 500° F.

*Example 3*

The procedure of Example 2 was repeated employing a 70% by weight toluene solution of 60% by weight of the resin of Example 1 and 40% by weight of a 100,000 cs. copolymer of 68 mol percent phenylvinylsiloxane, 29 mol percent monophenylsiloxane and 3 mol percent phenylmethylvinylsiloxane. The resulting laminate had a flexural strength at room temperature of 41,800 p.s.i. and a flexural strength of 19,000 p.s.i. at 500° F.

*Example 4*

The procedure of Example 3 was repeated except resin (2) was a 500,000 cs. copolymer of 25 mol percent diphenylsiloxane, 25 mol percent monophenylsiloxane and 50 mol percent phenylvinylsiloxane. The flexural strength of the cured laminate was 42,100 p.s.i. at room temperature and 11,400 p.s.i. at 500° F.

*Example 5*

The glass cloth of Example 1 was impregnated with a toluene solution of a siloxane mixture comprising 75% by weight of resin (1) of Example 1, 17.5% by weight of a 2400 cs. viscosity copolymer of 6 mol percent phenylmethylvinyl siloxane, 35 mol percent phenylvinylsiloxane and 59 mol percent phenylmethylsiloxane, and 7.5% by weight of diphenyldimethyldivinyldisiloxane. The mixture also contained .5% by weight dicumyl peroxide and .15% by weight beta-hydroxy ethyl trimethyl ammonium 2-ethylhexoate, both based upon the total weight of the siloxane. The laminate was prepared and cured as in Example 2 and the resulting product had a flexural strength of 49,000 p.s.i. at room temperature and 10,300 p.s.i. at 500° F.

*Example 6*

When a mixture of (1) 60% by weight of a copolymer of 10 mol percent diphenylsiloxane, 20 mol percent phenylmethylsiloxane, 30 mol percent monophenylsiloxane and 40 mol percent monomethylsiloxane; (2) 35% by weight of a 50,000 cs. copolymer of 5 mol percent monomethylsiloxane, 10 mol percent dimethylsiloxane, 15 mol percent monovinylsiloxane, 20 mol percent phenylvinylsiloxane and 50 mol percent phenylmethylsiloxane; and (3) 5% by weight of $PhSi(OSiMe_2Vi)_3$ is employed and cured in accordance with the procedure of Example 1, a heat stable laminate is obtained.

*Example 7*

Equivalent results are obtained when the compounds $[(CH_3)_2(C_2H_3)SiO]_3SiC_6H_4Si(C_6H_5)$
$\qquad [OSi(CH_3)_2(C_2H_3)]_2$,
$(CH_3)_3SiO[Si(C_6H_5)(C_2H_3)O]_2Si(CH_3)_3$ and
$[(C_6H_5)_2(C_2H_3)SiO]_2Si(CH_3)CH_2Si$
$\qquad (CH_3)_2OSi(C_6H_5)_2(C_2H_3)$ are each substituted for (3) in Example 6.

*Example 8*

The resin employed in this example was a mixture of 10% by weight of resin (1) of Example 1, 67.5% by weight of a 100,000 cs. copolymer of 68 mol percent phenylvinylsiloxane, 29 mol percent monophenylsiloxane and 3 mol percent phenylmethylvinylsiloxane and 22.5% by weight diphenyldimethyldivinyldisiloxane. The resin was catalyzed with 2% by weight dicumyl peroxide and .15% by weight beta-hydroxy ethyl trimethyl ammonium 2-ethylhexoate.

A 14 ply laminate was prepared by applying this resin to a sheet of 181 glass cloth, placing another sheet of the cloth on the treated piece so that the warp was at 90° to that of the first, applying an equal amount of resin to the second piece and repeating this procedure until all plies were laid up. The laminate was then molded at 30 p.s.i. at 175° C. for 30 minutes. A satisfactory laminate was obtained.

*Example 9*

181 heat cleaned glass cloth was impregnated with a 70% by weight toluene solution of a mixture of 75% by weight of (1) a copolymeric siloxane having the composition 10 mol percent diphenylsiloxane, 35 mol percent monophenylsiloxane and 55 mol percent monomethylsiloxane and 25% by weight of (2) a 20 cs. copolymer of dimethylvinylsiloxane and phenylvinylsiloxane, .5% by weight of dicumyl peroxide based on the total weight of the siloxane and .15% by weight beta-hydroxy ethyl trimethyl ammonium 2-ethylhexoate based on the weight of the siloxane. The impregnated cloth was air dried 30 minutes at room temperature and then heated 10 minutes at 90° C. The resulting impregnated cloth was flexible and was easily formed around a curved mold. The siloxane pickup on the cloth was 34%.

The impregnated cloth was then stacked in a 14 ply laminate with the alternate plies so arranged that the warp was at 90° to each other. The laminate was then molded into a flat sheet at 30 p.s.i. for 30 minutes at 175° C. It was then removed from the press cold and given an after-bake of 16 hours at 90° C. and then heated slowly from 125 to 250° C. over a period of 10 hours and finally heated an additional 12 hours at 250° C. At the end of this cure the flexural strength was 35,000 p.s.i. at room temperature and 17,000 p.s.i. at 500° F.

*Example 10*

The procedure of Example 9 was repeated employing 90% by weight of resin (1) of Example 9 and 10% by weight of diphenyldimethyldivinyldisiloxane, 1% by weight dicumyl peroxide and .18% by weight of beta-hydroxyethyl trimethyl ammonium 2-ethylhexoate. The resulting laminate had a flexural strength of 44,700 p.s.i. at room temperature and 11,800 p.s.i. at 500° F.

*Example 11*

Heat stable easily fabricated laminates are obtained when 90% by weight of resin (1) of Example 9 and 10% by weight of each of the following compounds are mixed and cured by the method of that example:

$[(C_6H_5)(C_2H_3)SiO]_4$, $(C_6H_5)Si[OSi(CH_3)_2(C_2H_3)]_3$,
$[(CH_3)_2(C_2H_3)SiO]_3SiC_6H_4Si$
$\qquad (C_6H_5)[OSi(CH_3)_2(C_2H_3)]_2$
$[(C_6H_5)_2(C_2H_3)SiO]_2Si(CH_3)CH_2Si$
$\qquad (CH_3)[OSi(C_6H_5)_2(C_2H_3)]_2$ and
$(CH_3)_2(C_2H_3)SiOSi(C_6H_5)_2OSi(CH_3)_2(C_2H_3)$.

*Example 12*

Equivalent results are obtained when a copolymer of 10 mol percent diphenylsiloxane, 5 mol percent phenylmethylsiloxane, 30 mol percent monophenylsiloxane and 55 mol percent monomethylsiloxane is substituted for resin (1) in Example 9.

*Example 13*

The siloxane employed in this example was a mixture of 75% by weight (1) a copolymer of 10 mol percent diphenylsiloxane, 30 mol percent monophenylsiloxane, 30 mol percent monomethylsiloxane and 30 mol phenylmethylsiloxane, added as a 60% by weight solution in toluene, and 25% by weight of (2) a 2400 cs. viscosity copolymer of 6 mol percent dimethylvinylsiloxane, 35 mol percent phenylvinylsiloxane and 59 mol percent phenylmethylsiloxane. To this siloxane solution were added 0.1 percent by weight beta-hydroxyethyltrimethylammonium 2-ethylhexoate and 0.5% by weight dicumylperoxide. Heat cleaned 181 glass cloth was immersed in the solution and then air dried 30 minutes and heated 10 minutes at 90° C. The siloxane pickup was 35%.

The impregnated cloth was used in making a 14 ply laminate according to the method of Example 2. A satisfactory laminate was obtained.

*Example 14*

When the following mixtures are each substituted for the siloxane mixture in Example 2, a heat stable laminate is obtained in each case.

A mixture of 20% by weight of a siloxane copolymer of 15 mol percent diphenylsiloxane units, 25 mol percent monophenylsiloxane units and 60 mol percent monomethylsiloxane units and 80% by weight of a 300,000 cs. copolymer of 40 mol percent phenylvinylsiloxane units, 44 mol percent phenylmethylsiloxane units, 6 mol percent monomethylsiloxane units, 3 mol percent monophenylsiloxane units, 5 mol percent units of the formula $O_{.5}Si(CH_3)(C_6H_5)C_6H_4Si(CH_3)(C_6H_5)O_{.5}$ and 2 mol percent units of the formula $OSi(C_6H_5)CH_2CH_2Si(C_6H_5)_2CH_2CH_2Si(C_6H_5)O$ A mixture of 45% by weight of a siloxane copolymer of 6 mol percent diphenylsiloxane units, 48 mol percent monophenylsiloxane units, 36 mol percent monomethylsiloxane units and 10 mol percent phenylmethylsiloxane units, 10% by weight of a 1,000,000 cs. copolymer of 78 mol percent phenylvinylsiloxane units, 7 mol percent phenylmethylsiloxane units, 10 mol percent units of the formula $O_{.5}Si(C_2H_3)(C_6H_5)CH_2Si(C_6H_5)(CH_3)O_{.5}$ and 5 mol percent units of the formula $O_{.5}Si(C_6H_5)(CH_3)CH_2CH_2CH_2Si(C_6H_5)O$ and 45% by weight of a 400 cs. copolymer of phenyldimethylsiloxane units and phenylvinylsiloxane units.

A mixture of 95% by weight of a copolymer of 15 mol percent diphenylsiloxane units, 30 mol percent monomethylsiloxane units, 25 mol percent monophenylsiloxane units and 30 mol percent phenylmethylsiloxane units, 1% by weight of a 1,000 cs. composition consisting of 92 mol percent phenylvinylsiloxane units and 8 mol percent phenylmethylvinylsiloxane units and 4% by weight of a 200 cs. composition of units of the formula $$O_{.5}Si(CH_3)_2CH_2CH_2Si(C_6H_5)(CH_3)O_{.5}$$

and phenylmethylvinylsiloxane units.

That which is claimed is:

1. A composition of matter comprising a mixture of from 5 to 95% by weight of (1) a siloxane composed essentially of from 4.5 to 17 mol percent diphenylsiloxane units, from 22 to 55 mol percent monophenylsiloxane units, from 25 to 65 mol percent monomethylsiloxane units and up to 38 mol percent phenylmethylsiloxane units and from 5 to 95% by weight of (2) a composition selected from the group consisting of (A) a silicon compound, compatible with (1), having a viscosity of at least 500 cs. at 25° C. and having per silicon atom an average of at least 1.5 hydrocarbon radicals selected from the group consisting of the phenyl, vinyl and methyl radicals such that the phenyl to silicon ratio is at least 0.7:1, the vinyl to silicon ratio ranges from 0.3:1 to 1:1 and each vinyl group is attached to a siloxy-silicon atom, the silicon atoms of (A) being joined by substituents selected from the group consisting of oxygen atoms, phenylene radicals and alkylene radicals of less than four carbon atoms, and (B) a silicon compound, compatible with (1) and (A), having a viscosity of less than 500 cs. at 25° C. and having at least two siloxy-silicon-bonded vinyl groups per molecule, the remaining silicon valences of (B) being satisfied with substituents selected from the group consisting of oxygen atoms, phenyl radicals, methyl radicals, phenylene radicals and alkylene radicals of less than four carbon atoms, said compound (B) being present in an amount no greater than 50% by weight of the cumulative weight of components (1) and (2).

2. An article of manufacture comprising glass fabric impregnated with the composition of claim 1.

3. An article of manufacture comprising a glass fabric impregnated with a cured composition of claim 1.

4. An article of manufacture comprising a glass fabric laminate impregnated and bonded with a cured composition of claim 1.

5. A molded article comprising a cured composition of claim 1 and an inorganic filler.

6. A moldable article comprising a composition of claim 1 and an inorganic filler.

7. A composition of matter comprising a mixture of from 5 to 95% by weight of a siloxane composed essentially of from 4.5 to 17 mol percent diphenylsiloxane units, from 22 to 55 mol percent monophenylsiloxane units, from 25 to 65 mol percent monomethylsiloxane units and up to 38 mol percent phenylmethylsiloxane units and from 5 to 95% by weight of a siloxane having a viscosity of at least 500 cs. at 25° C. and having per silicon atom an average of at least 1.5 phenyl, methyl and siloxy-silicon-bonded vinyl radicals such that the phenyl to silicon ratio is at least 0.7:1 and the vinyl to silicon ratio ranges from 0.3:1 to 1:1.

8. A composition of matter comprising a mixture of from 5 to 95% by weight of a siloxane composed essentially of from 4.5 to 17 mol percent diphenylsiloxane units, from 22 to 55 mol percent monophenylsiloxane units, from 25 to 65 mol percent monomethylsiloxane units and up to 38 mol percent phenylmethylsiloxane units and from 5 to 50% by weight of a siloxane having a viscosity of less than 500 cs. at 25° C. and having at least two siloxy-silicon-bonded vinyl groups per molecule, the remaining valences of said vinyl siloxane being satisfied with phenyl and methyl radicals.

9. A composition of matter comprising a mixture of from 5 to 95% by weight of (1) a siloxane composed essentially of from 4.5 to 17 mol percent diphenylsiloxane units, from 22 to 55 mol percent monophenylsiloxane units, from 25 to 65 mol percent monomethylsiloxane units and up to 38 mol percent phenylmethylsiloxane units and from 5 to 95% by weight of (2) a mixture of siloxanes consisting essentially of (A) a siloxane having a viscosity of at least 500 cs. at 25° C. and having per silicon atom an average of at least 1.5 phenyl, methyl and siloxy-silicon-bonded vinyl radicals such that the phenyl to silicon ratio is at least 0.7:1 and the vinyl to silicon ratio ranges from 0.3:1 to 1:1, and (B) a siloxane having a viscosity of less than 500 cs. at 25° C. and having at least two siloxy-silicon-bonded vinyl groups per molecule, the remaining valences of siloxane (B) being satisfied with phenyl and methyl radicals.

References Cited in the file of this patent

UNITED STATES PATENTS 2,714,099    Weyenberg _____ July 26, 1955
2,718,483    Clark _____ Sept. 20, 1955

UNITED STATES PATENT OFFICE

CERTIFICATE OF CORRECTION

Patent No. 2,934,464                      April 26, 1960

Kenneth R. Hoffman et al.

It is hereby certified that error appears in the printed specification of the above numbered patent requiring correction and that the said Letters Patent should read as corrected below.

Column 1, line 41, for "cured" read -- curved --; column 3, line 15, for that portion of the formula reading "$(C_2H_3)(CH_3)(C_6H_5)SiO_5$" read -- $(C_2H_3)(CH_3)(C_6H_5)SiO_{.5}$ --; column 8, line 25, for "30 mol phenyl-" read -- 30 mol percent phenyl- --.

Signed and sealed this 27th day of September 1960.

(SEAL)
Attest:
KARL H. AXLINE
Attesting Officer

ROBERT C. WATSON
Commissioner of Patents